(No Model.)
W. SCOTT.
RADIATOR.
No. 485,018. Patented Oct. 25, 1892.
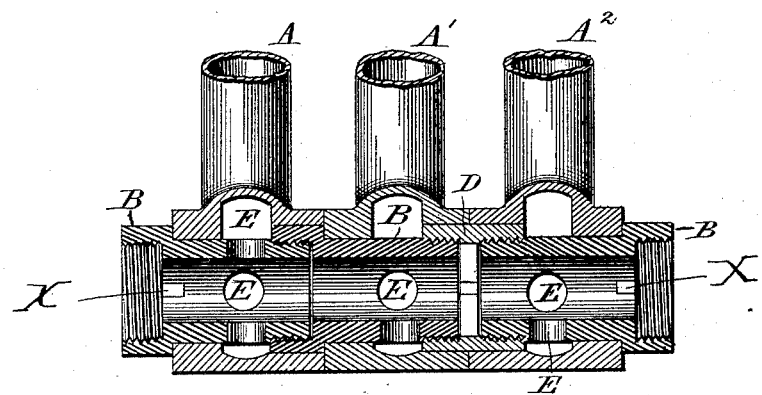
Witnesses:
T. E. Wilson
A. N. Wilson
Inventor.
Wm Scott
per James Dalgarns, Attorney

UNITED STATES PATENT OFFICE.

WILLIAM SCOTT, OF DETROIT, MICHIGAN.

RADIATOR.

SPECIFICATION forming part of Letters Patent No. 485,018, dated October 25, 1892.

Application filed November 3, 1890. Serial No. 370,246. (No model.)

*To all whom it may concern:*

Be it known that I, WILLIAM SCOTT, a citizen of the United States, residing at Detroit, in the county of Wayne, in the State Michigan, have invented a new and useful Improvement in Radiators, of which the following is a specification.

My invention relates to the manner of making the joints in that class of radiators commonly known as "loop-radiators," and is intended to obviate a difficulty which has been long felt in the manufacture of this class of devices—namely, that of getting a tight joint between the loops and at the same time have them stand square or parallel with one another.

My invention also obviates the necessity of tapping the cast-iron loops, as required by the ordinary method of using right and left threaded nipples, thereby reducing the cost of manufacture to the minimum, while making at the same time a strong and durable joint.

I attain these objects in the manner shown in the accompanying drawing, in which the figure is a vertical longitudinal section of a portion of a radiator embodying my invention.

A A' A² are loops, each having two coincident openings, one of which is larger in diameter than the other.

B B are tubes having internal screw-threads and a flange or enlargement at one end and external screw-threads at the other end and having openings E coincident with steam-passages in the several loops.

D is an internally-screw-threaded nipple the exterior diameter of which is such as to fit into the larger openings in two loops of the radiator.

X is a small projection on the inside of the tubes to engage with the tool by which they are screwed into place.

By reference to the drawing it will be seen that by placing two loops A' and A² with their larger openings adjacent to each other, and by placing nipple D inside said openings and screwing the tube B in each end of nipple D and by means of the flanges on tubes B engaging with the outer faces of loops A' and A², they will be held firmly together, and so on, by placing the larger opening of another loop on the projecting flange or enlargement of tube B the number of loops may be increased indefinitely, and although each tube when properly screwed up holds firmly its own loop still the tightening of the outside tubes tends to draw closer every joint in the combination.

What I claim as my invention, and wish to secure by Letters Patent, is—

The combination of three or more radiator-loops, each having two coincident openings in its base, one of which is larger in diameter than the other, the said loops being assembled so that the larger openings in two of them are adjacent and so that the smaller opening in one of the two and the larger opening of the third are adjacent, and a tie-rod extending through all of the openings of the loops and consisting of tubes, each having internal screw-threads and a flange or enlargement at one end and external screw-threads at the other end, two of said tubes being within the two loops aforesaid, having their flanges or enlargements engaging the opposite faces of the said loops and joined by a coupling which is interiorly screw-threaded at each end to receive the externally-screw-threaded ends of the tubes, said coupling fitting exteriorly the larger adjacent openings of the loops, and the third tube screwing at its smaller end into the screw-threads of the larger end of one of the other tubes and having its flange or enlargement engaging the outer side of the third loop, the said tie-rod having openings coincident with steam-passages formed in the several loops and adapted by virtue of the internal screw-threads in the remote tubes to receive steam supply and discharge pipes.

WILLIAM SCOTT.

Witnesses:
FRED S. LINSUE,
ED. W. THOMAS.